United States Patent [19]
Engle

[11] Patent Number: 5,971,498
[45] Date of Patent: Oct. 26, 1999

[54] ELECTRO-PNEUMATIC VALVE CONTROL

[75] Inventor: Thomas H. Engle, Clayton, N.Y.

[73] Assignee: Westinghouse Air Brake Company, Wilmerding, Pa.

[21] Appl. No.: 08/772,327

[22] Filed: Dec. 23, 1996

[51] Int. Cl.[6] .................................................. B60T 8/00
[52] U.S. Cl. .................................. 303/3; 303/15; 303/28
[58] Field of Search .................................... 303/3, 15, 28

[56] References Cited

U.S. PATENT DOCUMENTS

| | | | |
|---|---|---|---|
| 3,692,365 | 9/1972 | Demarez et al. | 303/3 |
| 3,814,483 | 6/1974 | Coiner et al. | 303/3 |
| 4,162,107 | 7/1979 | Bazelevich et al. | 303/3 |
| 5,064,251 | 11/1991 | Romansky | 303/3 |

*Primary Examiner*—Matthew C. Graham
*Assistant Examiner*—Melanie Torres
*Attorney, Agent, or Firm*—James Ray & Associates

[57] ABSTRACT

Electropneumatic brake control valve for control of brakes on a railway vehicle. It has a supply valve and release valve moved by a common displaceable actuator. The supply valve connects an air supply passage to a delivery passage and the release valve connects the delivery passage to an exhaust. The delivery passage is for supplying air to a brake shoe application device. The invention has a feedback space having pressure connection to the delivery passage. A portion of the common displaceable actuator is located within the feedback space, as is a positioner for the common displaceable actuator. The positioner has at least three force and displacement communication portions. The first communicates a first force and a first displacement with the common displaceable actuator. The invention has a pressure defining member which defines pressure by its position. It communicates a second force and a second displacement with the second one of the force and displacement communication portions. The invention has a pressure regulator which has a regulating member communicating a third force and a third displacement with the third one of the force and displacement communication portions. The regulator moves in accordance with a comparison between the air pressure in the feedback space and a force exerting device. The force exerted by the force exerting device is dependent on the third displacement. The invention also has apparatus for positioning the pressure defining member, this apparatus controlled by electrical signals from a brake control system of the railway vehicle.

25 Claims, 8 Drawing Sheets

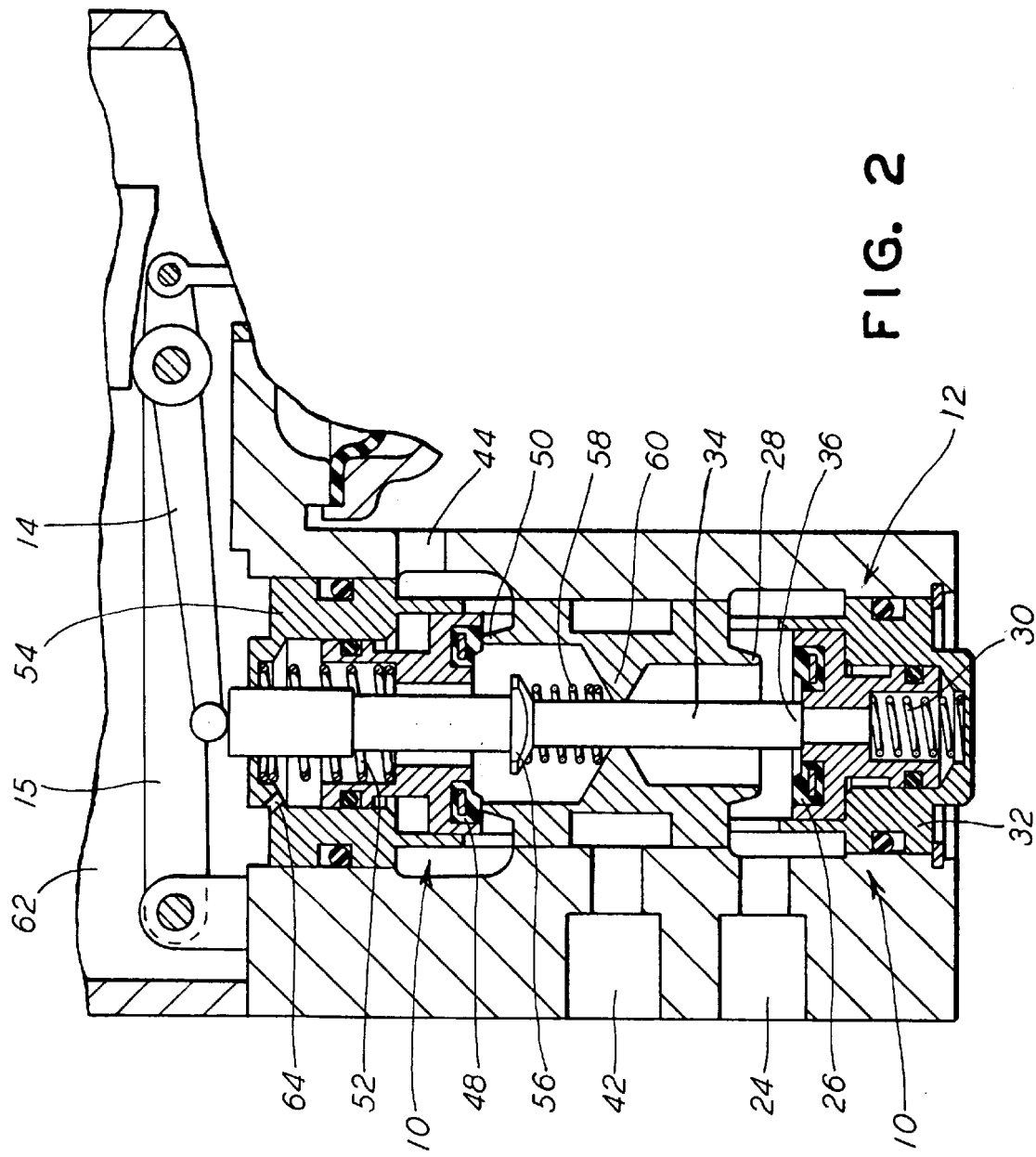

ELECTRO-PNEUMATIC VALVE CONTROL

CROSS-REFERENCE TO RELATED APPLICATIONS

The invention taught in this patent application is closely related to the invention taught in the following co-pending patent application Ser. No. 08/722,326: MICROPROCESSOR CONTROLLED RAILWAY CAR ACCOUNTING AND COMMUNICATION SYSTEM, filed concurrently with the present application. The above-referenced patent application is assigned to the assignee of the present invention. The teachings of this patent application are incorporated herein by reference thereto.

FIELD OF THE INVENTION

The present invention relates, in general, to electropneumatic valves and, more particularly, the instant invention relates to an electropneumatic valve for a railway braking system.

BACKGROUND OF THE INVENTION

In the classical railroad air brake system, as developed from the Westinghouse air brake, the brake air line which passes from the lead locomotive and then from vehicle to vehicle down the length of the train provides two basic functions.

First, it is used to charge compressed air tanks in the railroad cars. The air stored in these tanks provides the energy needed to apply the brake shoes when a brake application is required. When the train is running normally, and no brake application is needed, a high pressure, typically 90 pounds for freight trains and 110 pounds for passenger trains, exists in the brake air line. The tanks in the cars are charged to the same pressure as the air in the brake air line.

Second, when a brake application is required, air is vented from the brake air line through a valve in the lead locomotive. This causes the pressure in the brake air line to be reduced by a controlled amount. In the cars of the train, this reduction of pressure is used as a signal to apply the brakes. In this event, valving in the cars utilizes the compressed air in the tanks to supply air to brake cylinders which apply force to the brake shoes so that the brakes are applied.

Although this classical air brake system was an enormous improvement over the art prior to it, it nevertheless had some features where improvement was possible. For one thing, the time needed for a pressure decrement to propagate down the line of cars in a long freight train is quite long, about a minute for a mile-long train. Hence, when a brake application is required, it takes some time before all the brakes in the train are applied. This is the case for both normal and emergency brake applications.

There are also some operational difficulties due to the fact that the same compressed air line is used both for charging the air tanks in the cars and for signalling brake application. When a brake application is made, some of the air in the air tanks in the cars is depleted. Since the pressure in the brake air line has been reduced to signal the brake application, there is not sufficient air pressure in the brake air line to recharge the air in the tanks. The air in the tanks cannot be recharged to its initial pressure while the brake line air pressure is low for applying brakes.

An unfortunate practice which stems from this aspect of traditional airbrake systems is the practice of power braking. This is a case in which an engineer, upon starting to descend a grade, makes a brake application which is too large, so that the train does not maintain its preferred speed. In this case, the engineer may apply engine power to maintain speed. Hence, the brakes and locomotive are working against each other. Fuel is expended and brake shoes are worn.

One method of decreasing the time needed for the brake application signal to reach remote portions of the train is to provide a radio link so that when a signal originates in a lead locomotive to apply brakes, a radio signal is transmitted which is received at some distance down the line of cars. Where the signal is received, it causes local venting of the brake line, so that brakes are applied more rapidly. The WABCO EPIC® brake system, for example, may be operated with a radio link for this purpose (Registered trademark of Westinghouse Airbrake Company).

The radio approach may have difficulty due to terrain which intervenes between the locomotive and the remote receiver causing the remote unit to fail to dump brakepipe pressure. Hence, some systems use electrical trainlines which are electric cables connected between cars down the length of the train. These can carry signals to electropneumatic valves which vent brakepipe air at many points along the train and, hence, cause a rapid and uniform brake application.

Either of these approaches, the radio link or the trainline link can improve the response time of the system. However, the operational difficulty of not being able to reduce a brake application which is in force is not solved by shortening the time needed for brakepipe pressure to drop.

One approach which has been used to keep the tanks charged is to employ two brake air lines. One of them always contains high pressure air for keeping the tanks charged. The other brake air line is used to signal the need for brake application by a pressure decrement. This approach suffers from the added labor and time needed for assembling a train since two hoses need to be connected when two cars are connected. This approach alone solves the problem of keeping the tanks charged but suffers from the time delay caused by the slow speed of the pressure decrement signal. However, a radio link, or a trainline link may be used to dump brakepipe air at railway vehicles remote from the lead locomotive.

ENVIRONMENT OF THE INVENTION

This invention is for use on a train in which the lead locomotive and the individual railway vehicles are in communication through a rapid communication means, such as a radio link, or electrical conduction paths connected between coupled cars of the train. It is assumed that a microprocessor in the lead locomotive can send a normal or emergency brake application signal to microprocessors in all of the individual railway vehicles by these rapid communication means and that the individual microprocessors in the railway vehicles individually can report to the locomotive. An example of such a system is the referenced co-pending patent application: MICROPROCESSOR CONTROLLED RAILWAY CAR ACCOUNTING AND COMMUNICATION SYSTEM, filed concurrently with the present application.

It is also assumed that the classical brake air line is present in all the cars of the train with a complete pneumatic braking capability for use in case the electrical systems described in the present application malfunction.

SUMMARY OF THE INVENTION

The present invention provides an electropneumatic brake control valve for electropneumatic control of brakes on a railway vehicle. The invention has a pair of valves actuated by a common displaceable actuator, the pair of valves consisting of a supply valve for opening and closing a first valve passage between a first supply passage and a first delivery passage and a release valve for opening and closing a second valve passage between the first delivery passage and an air exhaust passage. The first delivery passage is for connection to a brake shoe application means on the railway vehicle.

The invention includes a first space which has pressure connection to the first delivery passage so it has a pressure approximately equal to the pressure in the first delivery passage. At least a portion of the common displaceable actuator is located within the first space.

Means are provided in the first space for positioning the common displaceable actuator. These means have at least three force and displacement communication portions, the first one of which communicates a first force and a first displacement with the common displaceable actuator.

The invention has a pressure defining member which defines pressure by its position. The pressure defining member communicates a second force and a second displacement with the second one of the force and displacement communication portions.

The invention also has a pressure regulating means which has a regulating member communicating a third force and a third displacement with the third one of the force and displacement communication portions. The regulating member moves in accordance with a comparison between the air pressure in the first space and a force exerting means. The force exerted by the force exerting means is dependent on the third displacement.

The invention also has means for positioning the pressure defining member, these means being controlled by electrical signals from a brake control system of the railway vehicle.

OBJECTS OF THE INVENTION

It is, therefore, one of the primary objects of the present invention to provide an electropneumatic brake system for a train of railway vehicles in which a brake application can be initiated along the entire length of the train at the speed of a radio or electrical signal.

Another object of the present invention is to provide an electropneumatic brake system for a train of railway vehicles which requires only a single brake airline passing down the length of the train.

Still another object of the present invention is to provide an electropneumatic brake system which in normal or in emergency situations, brake application is signalled electrically and in which the brake air line is normally kept fully charged.

Yet another object of the present invention is to provide an electropneumatic brake system in which, in the event of a failure of the electrical system, the lead locomotive can cause a brake application in all the cars of the train by dumping brakepipe air, as in the classical all-pneumatic systems.

Still another object of the present invention is to provide an electropneumatic brake system for a train of railway vehicles in which an engineer in the lead locomotive can make a controlled brake application, reduce the brake application, apply brakes again, etc. and never have a situation in which brake application is precluded because of depleted air pressure in the tanks in the individual railway vehicles.

A further object of the present invention is to provide an electropneumatic brake system for railway vehicles in which railway vehicles equipped with the electropneumatic system can easily be joined to vehicles not equipped with the electropneumatic system.

In addition to the various objects and advantages of the present invention which have been generally described above, there will be various other objects and advantages of the invention that will become more readily apparent to those persons who are skilled in the railway braking art from the following more detailed description of the invention, particularly, when such detailed description is taken in conjunction with the attached drawing figures and with the appended claims.

BRIEF DESCRIPTION OF THE DRAWINGS

FIG. 2 is a sectional drawing which shows a portion of the invention with a valve set to admit air from a supply passage connected to the reservoir and apply the air to the first delivery passage of the invention and to close a valve between the first delivery passage and the exhaust.

Figure 1A:
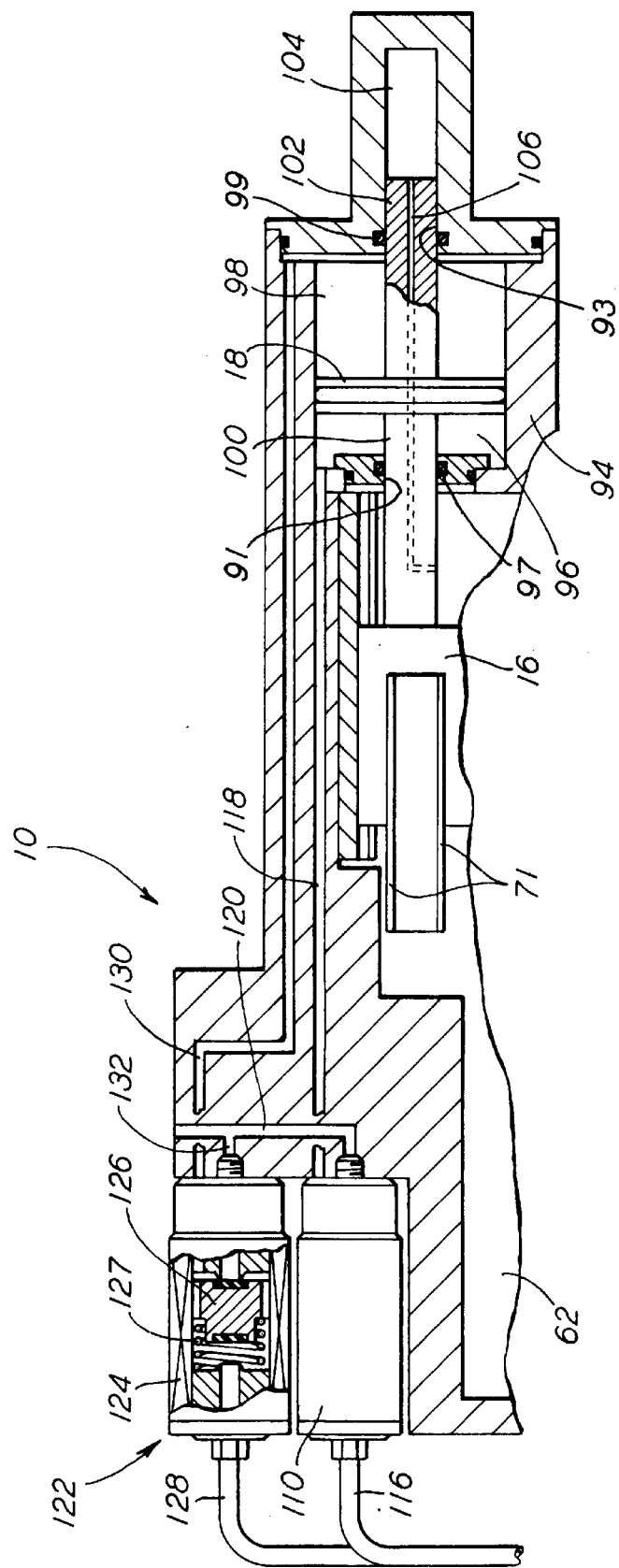
FIG. 1A is a sectional drawing of a portion of the invention including a pair of solenoid valves and a pressure defining member positioned by air from the solenoid valves.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing Figures, for the sake of clarity and understanding of the invention.

Figure 1B:
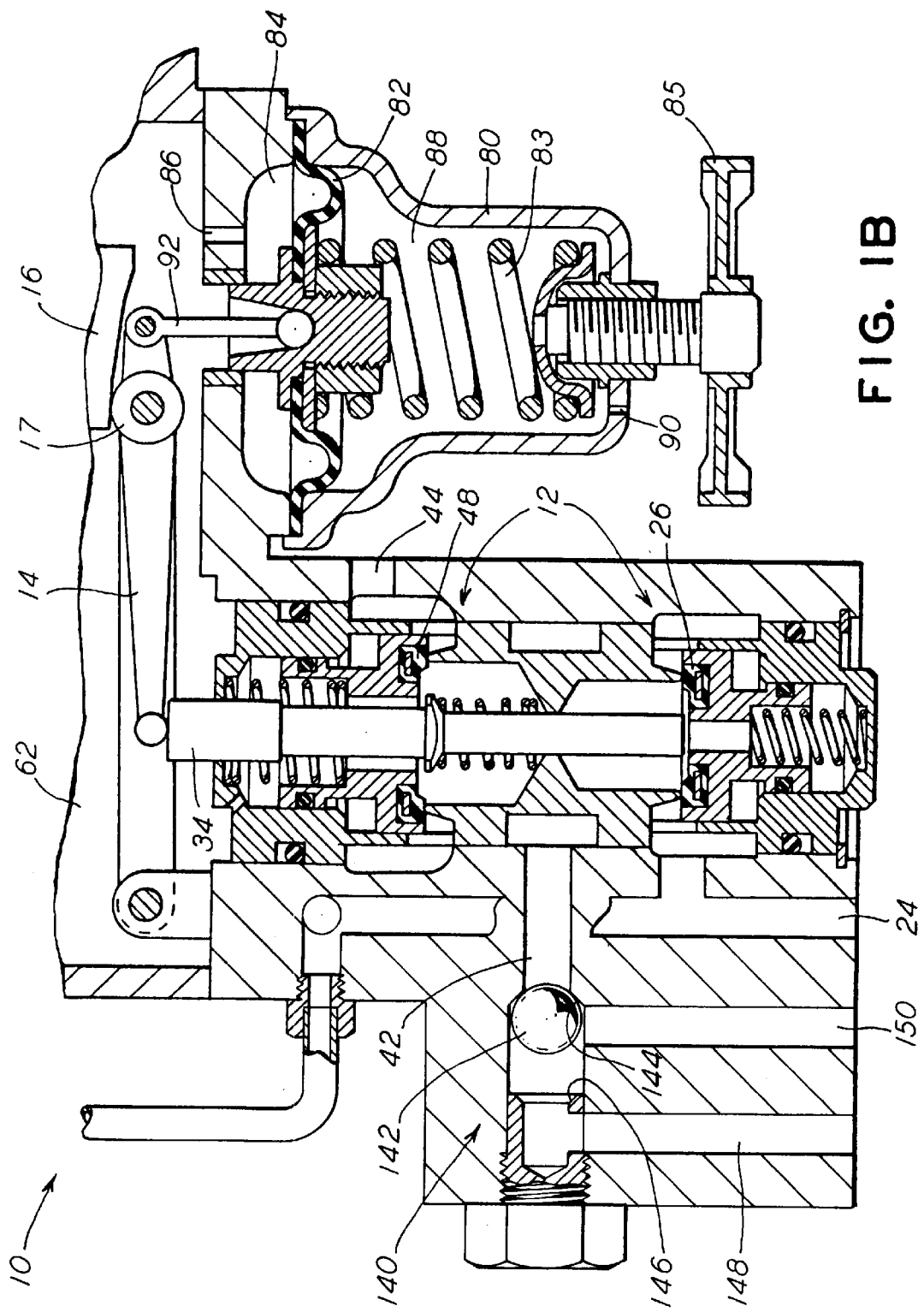
FIG. 1B is a sectional drawing of a supply valve and release valve for supplying a regulated brake cylinder pressure established by the pressure defining member.

FIGS. 1A and 1B show the principal features of the invention. The electropneumatic brake valve 10 has a pair of valves 12 which have a common pressure control stem 34, a supply valve 26 for admitting air from a supply passage 24 to a first delivery passage 42, and a release valve 48 for exhausting air from first delivery passage 42 to an exhaust passage 44. The pair of valves 12 is shown in greater detail in FIGS. 2, 3, and 4.

The position of the pressure control stem of the pair of valves 12 is established by a yoke 14. Yoke 14 provides a balance of forces and displacements between the pressure control stem 34 of the pair of valves 12, a moveable cam 16 and pressure regulating stem 92 of pressure regulator 80. The yoke 14 is shown in greater detail in FIGS. 2,3, and 4.

Cam 16 is attached to piston rod 100 which is moved by piston 18. Piston 18 is slidably disposed within cylinder 94. Piston 18 is positioned by differential air pressure between first cylinder air space 96 and second cylinder air space 98. Piston rod 100 passes through port 91 between first cylinder air space 96 and feedback space 62. Preferably, a seal 97 is mounted circumferentially around piston rod 100 to seal between piston rod 100 and port 91. This prevents air loss between first cylinder air space 96 and feedback space 62. It is preferred that seal 97 be an O-ring. Air pressure in first cylinder air space 96 is controlled by first electrically activated valve 110. Air pressure in second cylinder air space 98 is controlled by second electrically activated valve 122. The first electrically activated valve 110 is shown in an exterior view and the second electrically activated valve 122 is shown in longitudinal section. The internal features of the first electrically activated valve 110 are similar to those of the second electrically activated valve 122.

The figure shows the electrical coil 124 of the second electrically activated valve 122 and its moveable portion 126. When this valve is deenergized, spring 127 forces moveable portion 126 to the right thereby blocking the second electrically activated valve exhaust passage 132. Also, in the deenergized position, the end of supply passage 128 is uncovered. Air flows around the spring 127 and moveable piece 126 to reach delivery passage 130 which provides high pressure air to the second cylinder air space 98.

When this valve is energized, moveable member 126 is moved to the left blocking off the air supply passage 128 and uncovering the exhaust passage 132 whereupon air from the second cylinder air space 98 flows out through exhaust passage 132. The first electrically activated valve 110 functions in a similar manner. When it is deenergized, it supplies air from supply passage 116 to the first cylinder air space 96 through delivery passage 118. When it is energized, it blocks off the air supply passage 116 and opens exhaust passage 120 whereupon air from the first cylinder air space 96 flows out through exhaust passage 120.

With this system, whenever the piston is kept in a fixed position, no electrical power is required. Both of the electrically activated valves are deenergized so each applies the full pressure from its supply passage to its cylinder air space. The supply passages 116 and 128 are connected as shown so, in this case, the same pressure is applied to both sides of the piston.

In addition to the forces on the piston due to pressure in the first and second cylinder air spaces, there is also a force due to the pressure in the feedback space 62 pressing against the cross-sectional area of piston rod 100. To balance out this force, pressure balancing rod 102 is provided which passes through part 93 into pressure balancing space 104. It is preferred that a seal 99 be mounted circumferentially around pressure balancing rod 102 to seal between pressure balancing rod 102 and port 93 to prevent leakage of air between second cylinder air space 98 and pressure balancing space 104. Preferably, seal 99 is an O-ring. The air pressure in space 104 is about equal to the pressure in feedback space 62 and the cross-sectional area of pressure balancing rod 102 is about equal to the cross-sectional area of piston rod 100. Hence, the force exerted on the pressure balancing rod 102 by air in pressure balancing space 104 is approximately equal to the force on piston rod 100 due to air in feedback space 62. The air pressure in pressure balancing space 104 is equilibrated with the pressure in feedback space 62 through passage 106. In this particular embodiment, this passage is drilled axially through pressure balancing rod 102, piston 18 and a portion of piston rod 100. It communicates with air in the feedback space 62 through the radial passage shown near the left end of piston rod 100.

Pressure regulator 80 responds to the pressure of air in feedback pressure space 84 which communicates with feedback space 62 through second feedback pressure port 86. This pressure exerts a downward force on diaphragm 82. The space 88 under diaphragm 82 has air at the pressure of the ambient atmosphere. Hence, diaphragm 82 experiences an upward force due to the atmosphere in space 88. Space 88 communicates with the atmosphere through atmospheric pressure port 90.

The diaphragm 82 is also pressed downward by the regulating stem 92 and is pressed upward by spring 83. The force exerted by spring 83 may be adjusted by handwheel 85.

The embodiment of the invention shown in FIG. 1 also has a double check valve 140 which is used to employ the present invention in concert with a conventional automatic brake valve. Double check valve 140 receives first delivery pressure from first delivery passage 42 and a second delivery pressure from second delivery passage 148. Double check valve 140 passes the higher of the two pressures, the first delivery pressure and the second delivery pressure, to the final delivery passage 150.

The moveable portion of double check valve 140 is ball 142. If the first delivery pressure exceeds the second delivery pressure, the ball is moved by the pressure difference to seal against double check valve second seat 146. This permits air from first delivery passage 42 to flow into final delivery passage 150.

If the second delivery pressure exceeds the first delivery pressure, the ball is moved by the pressure difference to seal against double check valve first seat 144. This permits air from second delivery passage 148 to flow into final delivery passage 150. Hence, with this arrangement, if either the electropneumatic brake control valve of the present invention or the conventional pneumatic automatic brake valve sends a pressure signal for brake application then the final delivery passage carries a signal for brake application. The final delivery passage 150 is connected to a brake cylinder of the railway vehicle.

FIG. 2 shows the pair of valves 12 having a pressure control stem 34 in greater detail. This figure shows supply passage 24, supply valve 26 and supply valve seat 28. In this figure, supply valve 26 is shown in an open position to pass air from supply port 24 to the first delivery passage 42. Supply valve 26 is pressed downward by the lower end 36 of pressure control stem 34. Release valve 48 is also shown which, in this figure, is seated against release valve seat 50. Release valve spring 52 presses release valve 48 against release valve seat 50. The release valve is closed to prevent air from passing out through exhaust passage 44.

This figure also shows the supply valve spring 30 which is compressed when supply valve 26 is opened. A lower end cap 32 restrains the lower end of application supply valve spring 30. The figure also shows the control stem spring 58 in its most compressed state. It is supported by spring support annulus 60 and is compressed by shoulder piece 56 which is attached to pressure control stem 34.

This figure also shows release valve spring 52 which is restrained by upper end cap 54. In this figure, release valve spring 52 presses release valve 48 into engagement with release valve seat 50.

First feedback port 64 is also shown. This connects air from the stem region of the valves, which has the same pressure as the first delivery passage 42, to the feedback space 62.

Figure 3:
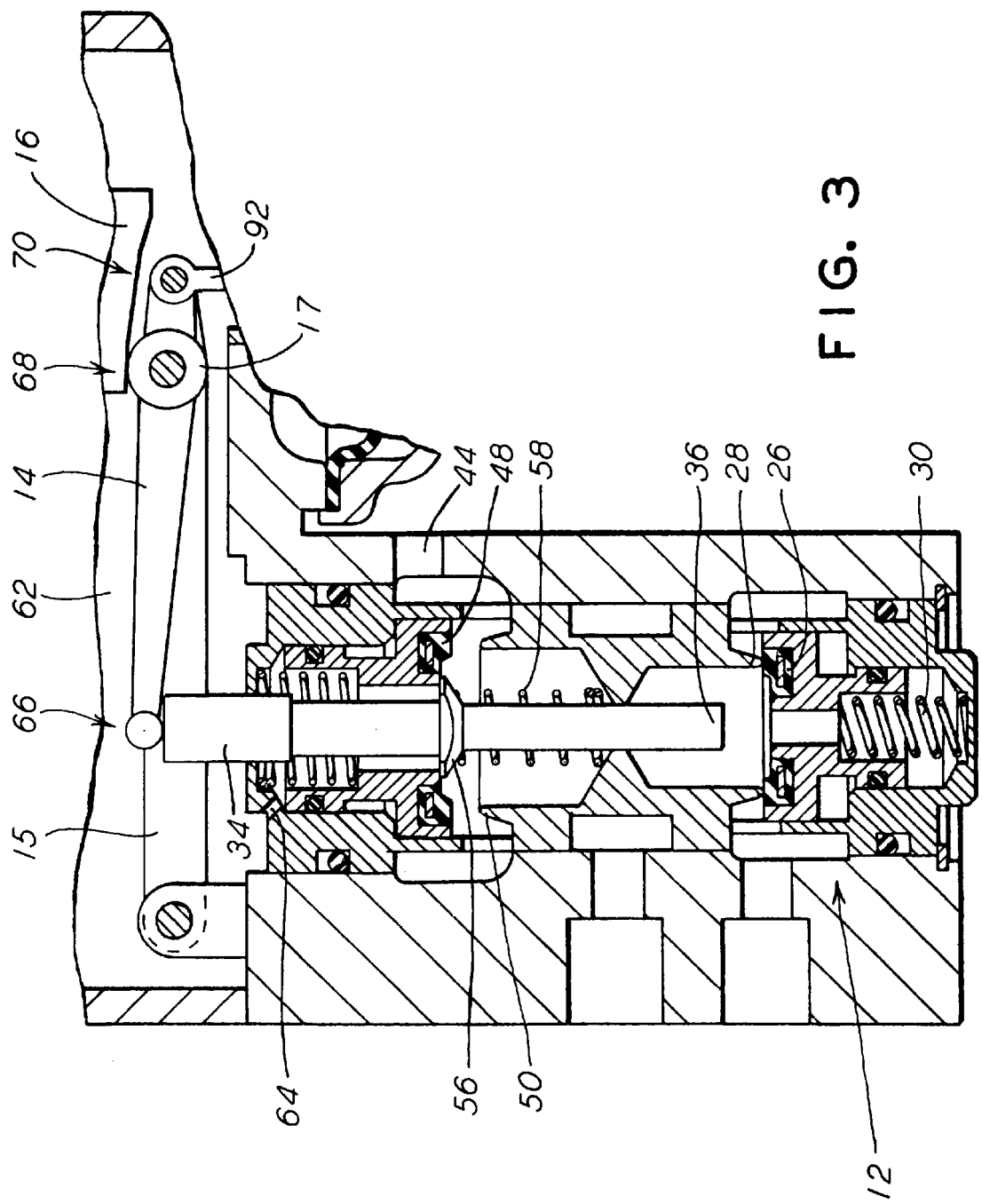
FIG. 3 is a sectional drawing of the portion of the invention shown in FIG. 2 in which the valve between the supply passage and the first delivery passage is closed and in which the valve between the first delivery passage and the exhaust is opened.

FIG. 3 shows the pair of valves 12 in a position for brake release. Pressure control stem 34 is displaced upward by control stem spring 58, so its lower end 36 is lifted above supply valve 26, so that supply valve spring 30 presses the supply valve 26 against the supply valve seat 28. In this upward displaced position, shoulder piece 56 lifts the release valve 48 off of the release valve seat 50. This causes air to be exhausted through the exhaust passage 44. FIG. 3 also shows first force and displacement communication portion 66 where yoke 14 contacts pressure control stem 34. It also shows the second force and displacement communication portion 68 where force and displacement are communicated with pressure defining movable cam 16 through cam follower 17. It also shows the third force and displacement communication portion 70, which contacts regulating stem 92.

Figure 4:
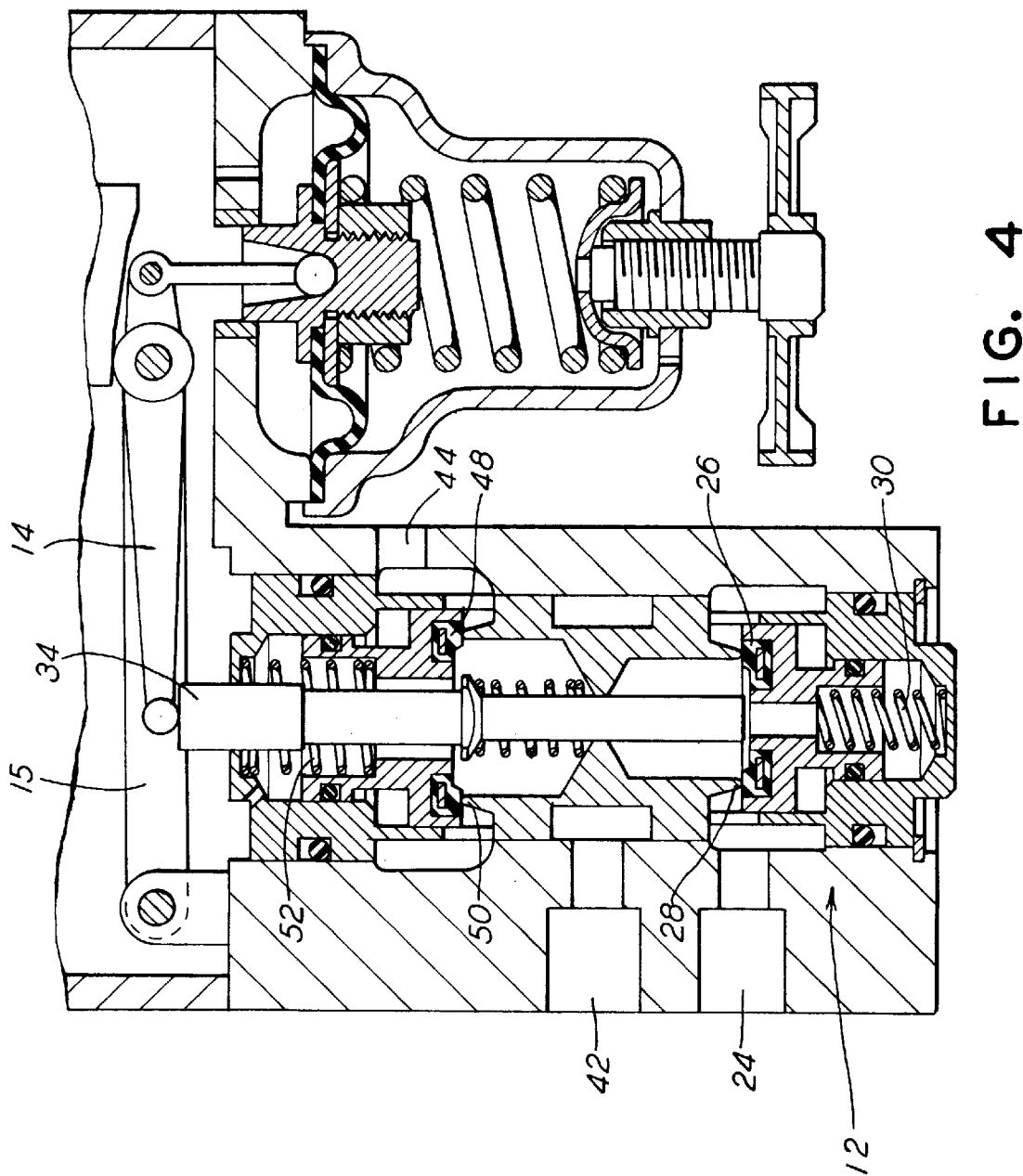
FIG. 4 is a sectional drawing of the portion of the invention shown in FIG. 2 and in FIG. 3, in which both valves are closed, which is a lap position.

FIG. 4 shows the pair of valves 12 in a lap position, in which pressure control stem 34 is in an intermediate position. In this position, the supply valve spring 30 presses supply valve 26 into engagement with supply valve seat 28, thus, closing the pathway between the supply passage 24 and the first delivery passage 42. Also, the release valve spring 52 presses the release valve 48 against release valve seat 50, closing the path way to exhaust passage 44.

FIGS. 2,3, and 4 also show yoke 14 in the three positions illustrated in these figures. Positional constraint of yoke 14 is provided by elongate member 15, which is pivotally connected to it, and to a fixed portion of valve 10.

Feedback of the pressure being requested by the position of the moveable cam 16 is provided by code bars 71 which generate a binary signal indicative of the position of cam 16. The code bars may, for example, have dark and light portions which are read by photo sensors, or by other convenient means. The binary signal may, for example, be a grey code which produces an unambiguous indication of the position of cam 16. A microprocessor (not shown) on the railway vehicle reads the binary signal and, if necessary, sends a signal to either the first electrically activated valve 110, or to the second electrically activated valve 122. This moves piston 18 to move cam 16 to a position corresponding to the pressure requested by the microprocessor.

Figure 5:
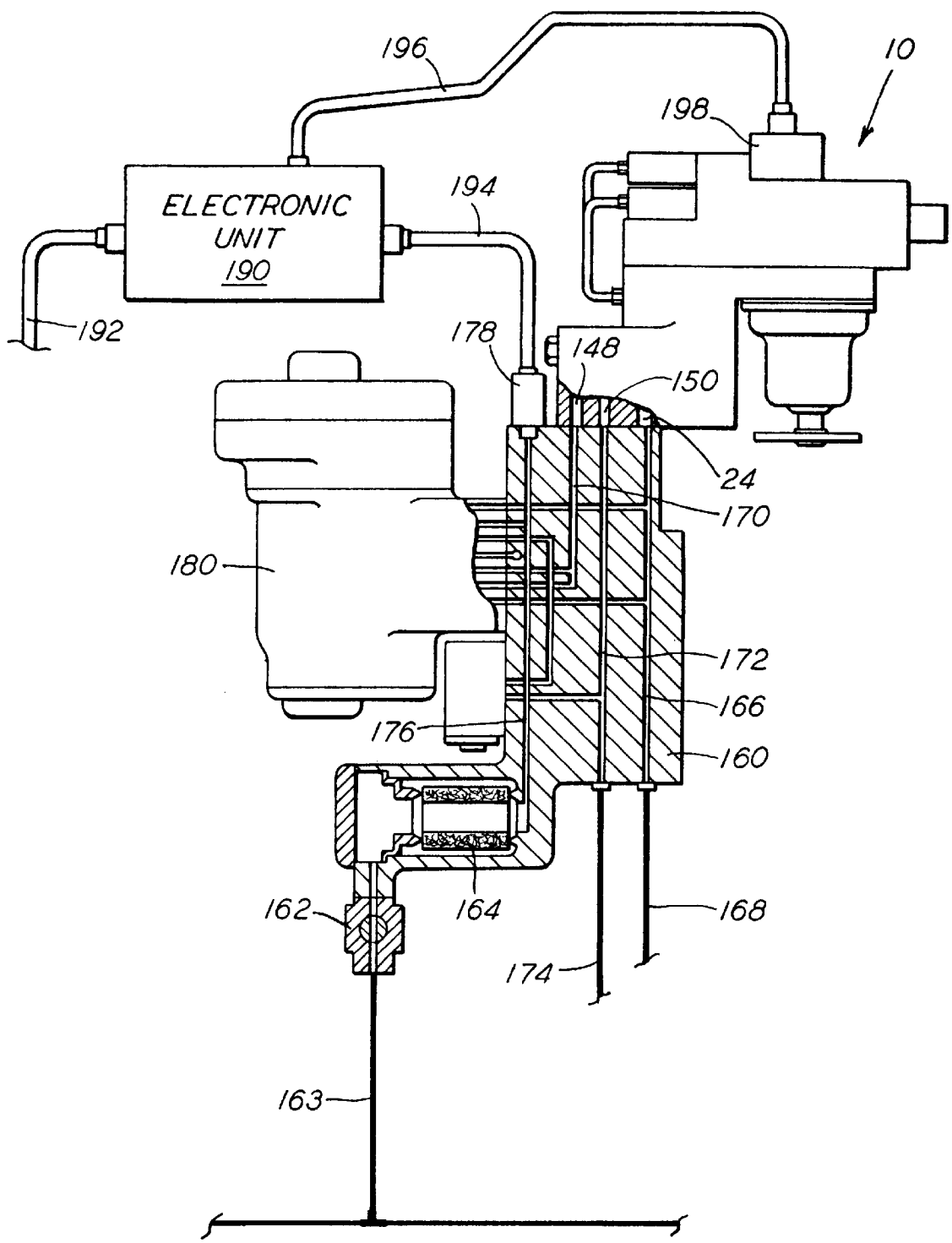
FIG. 5 is a sectional drawing showing the invention with a pipe bracket connected to a conventional all-pneumatic automatic brake system.

FIG. 5 shows an embodiment of this invention in which the electropneumatic brake control valve 10 is attached to a pipe bracket 160 which connects to a pneumatic automatic brake valve 180. Brake valve 180 may be, for example, a WABCO MC-30 control valve which will be recognized by a person skilled in the art.

The purpose of this combination is to provide a system having the advantages of electrical control with the all-pneumatic valve available in the event of failure of the electrical system. Pipe bracket 160 receives brakepipe pressure through line 163, passes it through a coarse filter at 162 and a fine filter at 164. From fine filter 164, air passes through passage 176 to brakepipe pressure switch 178. Pressure switch 178 may, for example, be used to determine whether brakepipe pressure is sufficient for electrical valve operation.

Air from a supply reservoir (not shown) flows through air line 168 to passage 166 of pipe bracket 160 and then to supply passage 24 of electropneumatic brake control valve 10. Pneumatic brake control valve 180 supplies brake application air to passage 170 in bracket 160, which carries the air to second delivery passage 148.

Passage 172 in pipe bracket 160 carries air from final delivery passage 150 to brake cylinder air line 174 connected to a brake cylinder (not shown).

Electrical signals for control of the electropneumatic valve 10 are carried on electrical cable 192 into electronics unit 190. A signal from brakepipe pressure switch 178 is received through cable 194 and signals for control of electrically activated valves 110 and 122 are passed through cable 196 and junction box 198. Pressure feedback signals from code bars 71 also pass through junction box 198 and cable 196.

Figure 6:
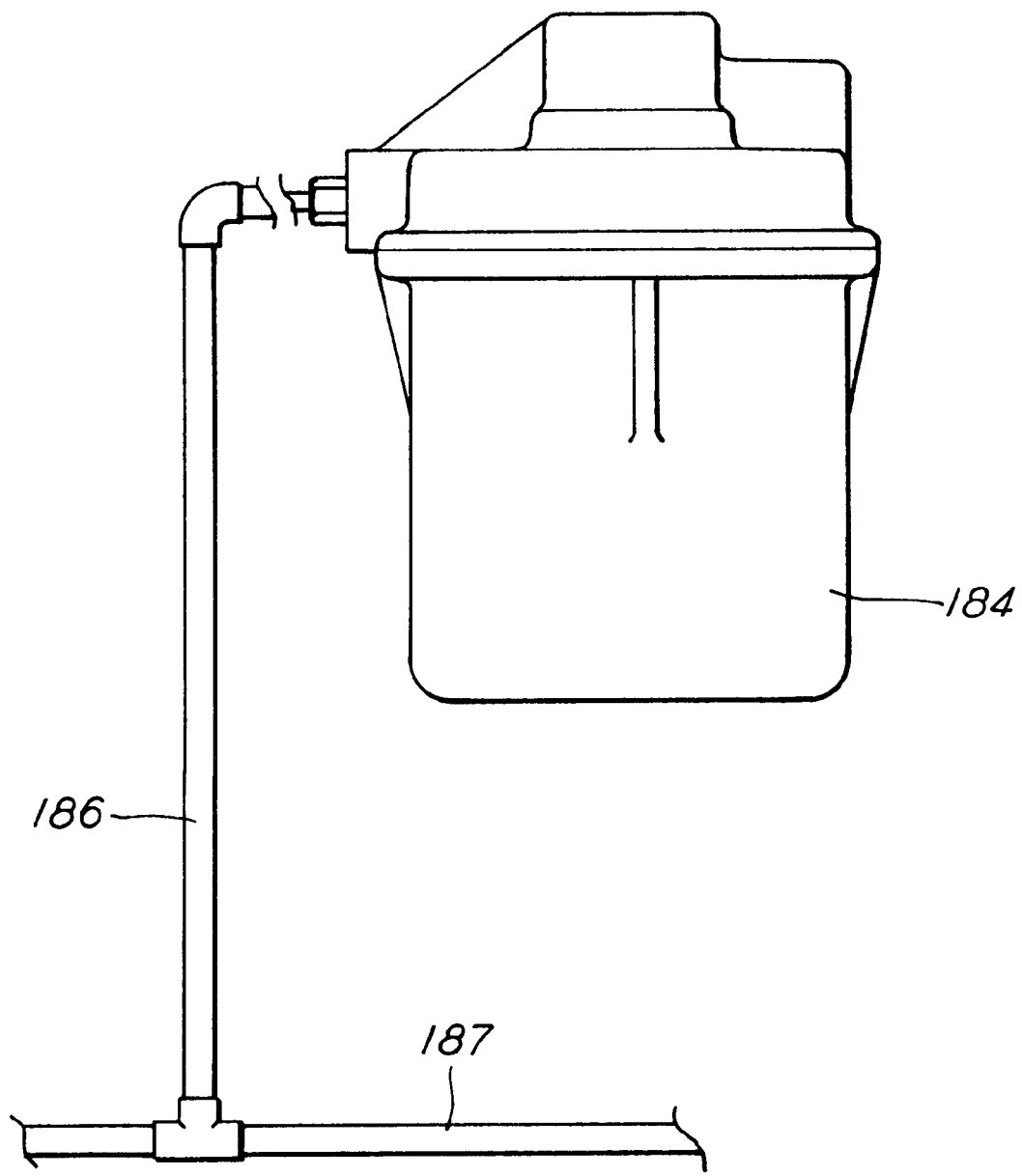
FIG. 6 shows a vent valve for use with the configuration of FIG. 5.

FIG. 6 shows a vent valve 184 which is recommended for use with the embodiment which includes pipe bracket 160. The purpose of vent valve 184 is to improve the response of other railway vehicles to an emergency reduction of brakepipe pressure. Vent valve 184 is sensitive to a rapid reduction in brakepipe pressure which would be for an emergency brake application. If vent valve 184 detects an emergency brakepipe reduction, it opens, thus dumping brakepipe air more rapidly and signalling other cars that an emergency brakepipe pressure reduction is in effect. Vent valve 184 is connected to brakepipe 187 through line 186.

Figure 7:
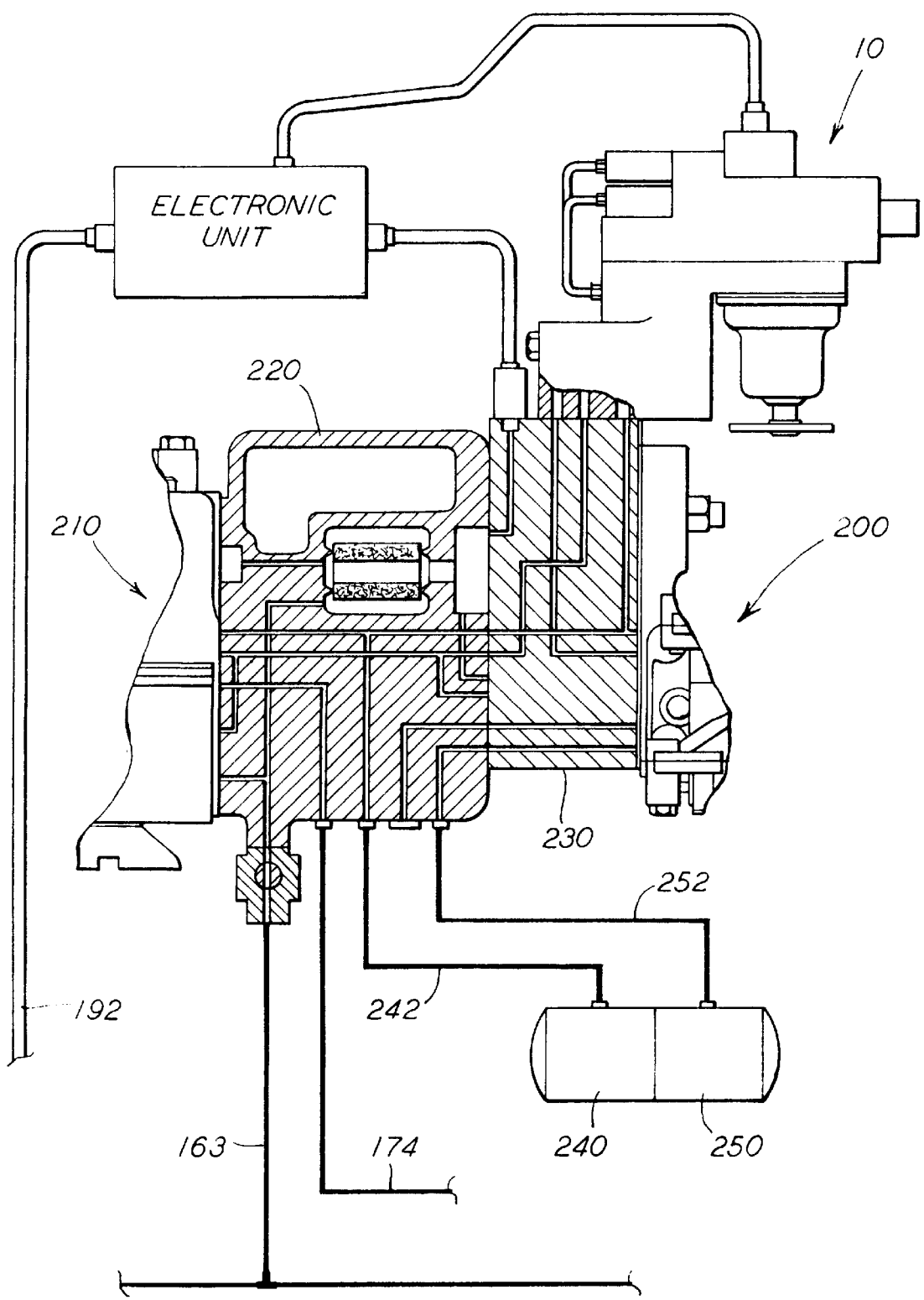
FIG. 7 is a sectional drawing showing the invention with a pipe bracket and filling piece connected to a conventional all-pneumatic brake system and to a conventional all-pneumatic emergency brake system.

FIG. 7 shows an embodiment in which electropneumatic brake valve 10 is attached to a conventional pneumatic braking system. A person skilled in the art will recognize 200 as the service portion of the ABDX system, 210 as the ABDX emergency portion and 220 as the American Association of Railroads standard pipe bracket. This embodiment has EXP filling piece 230 which connects pipe bracket 220 and service portion 200 to electropneumatic brake valve 10. In this case, an emergency air reservoir 240 and reservoir 250 are both included. Reservoir 250 is connected to pipe bracket 220 through line 252 and emergency reservoir 240 is connected to pipe bracket 220 through line 242. One function of the ABDX emergency portion is to detect an emergency brakepipe pressure reduction and admit air from the emergency reservoir to the auxiliary reservoir to increase brake application pressure in line 174. The ABDX emergency portion also vents brakepipe air in the event that it detects an emergency brake application. It makes vent valve 184 of the previous embodiment unnecessary.

Now, discussing the invention more broadly, there is disclosed an electropneumatic brake control valve for a railway vehicle which has a pair of valves actuated by a common displaceable actuator. The pair of valves consists of a supply valve for opening and closing a first valve passage between a first supply passage and a first delivery passage and an release valve for opening and closing a second valve passage between the first delivery passage and an exhaust passage. The first delivery passage is for connection to a brake shoe application means of the railway vehicle. The valve has a feedback space which has pressure connection to the first delivery passage and has a pressure about equal to the pressure in the first delivery passage. At least a portion of the common displaceable actuator is disposed within the feedback space.

The system has means for positioning the common displaceable actuator, these means located in the feedback space. These means have at least three force and displacement communication portions. The first of these communicates a first force and a first displacement with the common displaceable actuator. The second of these communicates a second force and a second displacement with a pressure defining member which defines pressure by its position. The third communicates a third force and a third displacement with a regulating member of a pressure regulating means.

The regulating member moves in accordance with a balance between the pressure in the feedback space and a force exerting means, the force dependent on the position of the regulating member.

The system has means for positioning the pressure defining member, these means controllable by electrical signals from a brake control system of the railway vehicle.

The means for positioning the common displaceable actuator may be a first elongate member having the three contact areas located at different positions along its length.

The system may also have a second elongated member which has one end pivotally connected to the first elongate member, and pivotally attached to a fixed portion of the electropneumatic brake control valve.

The first elongate member may be formed as a yoke having two side portions which are disposed on opposite sides of the second elongate member.

Provision may be made for positioning the common displaceable actuator in at least three positions, a first position in which the supply valve is open and the release valve is closed, a second position in which the supply valve and the release valve are both closed and a third position in which the release valve is opened and the supply valve is closed.

The supply valve may be spring loaded so it is pressed against the supply valve seat for a closed position and may be moveable by the common displaceable actuator to an open position.

The release valve may be spring loaded so it is pressed against the release valve seat for a closed position and may be moveable by the common displaceable actuator to an open position.

The force exerting means may be a spring having a first end in contact with the regulating means and a second end located at a predetermined position. The predetermined position of the second end of the spring may be adjustable. A handwheel may be used for this purpose.

The means for positioning the pressure defining member may include a piston disposed within a cylinder, the cylinder having two air cylinder air spaces, a first cylinder air space on a first side of the piston and a second cylinder air space on a second side of the piston, the pressure of air in the first cylinder air space controlled by a first electrically activated valve and a pressure of air in the second cylinder air space controlled by a second electrically activated valve.

The first electrically activated valve may normally open a first supply path between the air supply and the first cylinder air space and normally close a first exhaust path between the first cylinder air space and an exhaust. Also, the first electrically activated valve, when energized, may close the first supply path to the first cylinder air space and, when energized, may open the first exhaust path between the first cylinder air space and the exhaust.

The second electrically activated valve may normally open a second supply path between the air supply and the second cylinder air space and may normally close a second exhaust path between the second cylinder air space and an exhaust. Also, the second electrically activated valve, when energized, may close the second supply path to the second cylinder air space and, when energized, may open the second exhaust path between the second cylinder air space and the exhaust.

A piston rod may be connected to the first side of the piston, the piston rod passing through a first port between the first cylinder air space and the feedback space, the piston rod connected to the pressure defining member. Sealing means may be disposed between the first port and the piston rod to prevent leakage of air around the piston rod.

A pressure balancing rod may be connected to the second side of the piston, the pressure balancing rod passing through a second port between the second cylinder air space and a pressure balancing space, the pressure balancing rod having a cross-sectional area about equal to the cross-sectional area of the piston rod, sealing means may be disposed between the second port and the pressure balancing rod to prevent leakage of air around the pressure balancing rod. A passage may connect the space containing the pressure defining member to the pressure balancing space so that the pressure of air in the pressure balancing space is about equal to the pressure of air in the feedback space so that the force due to air acting on the piston rod is balanced out by an approximately equal and opposite force on the pressure balancing rod.

The passage connecting the space containing the pressure defining member to the pressure balancing space may pass in a lengthwise direction through at least a portion of the piston rod and through at least a portion of the pressure balancing rod.

Means may be provided for sensing the position of the pressure defining member and generating a signal indicative of the position of the pressure defining member and for transmitting the signal back to the brake control system of the railway vehicle to provide a feedback signal for control of the position of the pressure defining member. These means may use a grey code to generate an unambiguous binary electrical signal which indicates the position. The grey code may be generated optically by a plurality of photosensors observing tracks attached to the pressure defining member.

The pressure defining member may be a cam which is moved in a first direction by the means for positioning the pressure defining member and which presses against and positions the second of the three force and displacement communication portions of the means for positioning the common displaceable actuator.

The cam may have a plurality of slopes so that the set of pressures resulting from the grey code have small changes between adjacent grey code steps when brake application is light and large changes when brake application is heavy.

The electropneumatic brake control valve of this invention may also have a passage for receiving a pneumatic brake application pressure signal from a pneumatic automatic brake valve controlled by the pressure of air in the brakepipe of the railway vehicle.

A double check valve may be provided to receive the pneumatic brake application pressure signal from the pneumatic automatic brake valve and to receive the pressure in the first delivery passage. The double check valve may pass the higher of the pressure in the first delivery passage and the pneumatic brake application pressure signal to a third delivery passage, the third delivery passage being for connection to the brake shoe application means of the railway vehicle.

The electropneumatic brake control valve may further include a pipe bracket for mounting the electropneumatic brake control valve and the pneumatic automatic brake valve. The pipe bracket may have a passage for connecting the pneumatic brake application pressure signal to the passage for receiving the pneumatic brake application pressure signal.

The valve may further include a pipe bracket for mounting the electropneumatic brake control valve and the pneumatic automatic brake valve, the pipe bracket having a second supply passage for connection to the first supply passage, the second supply passage for connection to a supply reservoir of the railway vehicle.

The valve may also include a pipe bracket for mounting the electropneumatic brake control valve and the pneumatic automatic brake valve, the pipe bracket having a third delivery passage, the third delivery passage for connection to a brake cylinder of the railway vehicle.

The valve may include a filling piece for connecting the electropneumatic valve to a standard pipe bracket, to the service portion of a standard pneumatic automatic brake valve and, through the standard pipe bracket, to the emergency portion of the standard pneumatic brake control valve.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit or the scope of the appended claims.

I claim:

1. An electropneumatic brake control valve for electropneumatic control of brakes on a railway vehicle, said electropneumatic brake control valve comprising:
    (a) a pair of valves actuated by a common displaceable actuator, said pair of valves consisting of a supply valve for opening and closing a first valve passage between a first supply passage and a first delivery passage and a release valve for opening and closing a second valve passage between said first delivery passage and an air exhaust passage, said first delivery passage for connection to a brake shoe application means on such railway vehicle;
    (b) a feedback space having pressure connection to said first delivery passage, said feedback space having a pressure about equal to a pressure in said first delivery passage, at least a portion of said common displaceable actuator disposed within said feedback space;
    (c) means disposed within said feedback space for positioning said common displaceable actuator, said means for positioning said common displaceable actuator having at least three force and displacement communication portions, a first of said at least three force and displacement communication portions communicating a first force and a first displacement with said common displaceable actuator;
    (d) a pressure defining member, said pressure defining member defining pressure by its position, said pressure defining member communicating a second force and a second displacement with a second of said at least three force and displacement communication portions;
    (e) a pressure regulating means having a regulating member communicating a third force and a third displacement with a third one of said at least three force and displacement communication portions, said regulating member moving in accordance with a comparison between said pressure in said feedback space and a force exerting means, a force exerted by said force exerting means dependent on said third displacement of said regulating member;
    (f) means connected to said pressure defining member for positioning said pressure defining member, said means controllable by electrical signals from a brake control system of such railway vehicle.

2. An electropneumatic brake control valve according to claim 1 wherein said means for positioning said common displaceable actuator is a first elongate member having said at least three force and displacement communication portions disposed at different locations along a length of said first elongate member.

3. An electropneumatic brake control valve according to claim 2 further comprising a second elongate member having a first end pivotally connected to said first elongate member, said second elongate member having a second end pivotally attached to a fixed portion of said electropneumatic brake control valve.

4. An electropneumatic brake control valve according to claim 3 wherein said first elongate member is formed as a yoke having a first side portion and a second side portion, said first side portion and said second side portion of said yoke disposed on opposite sides of said second elongate member.

5. An electropneumatic brake control valve according to claim 1 wherein said common displaceable actuator can be positioned in at least three positions, a first position wherein said supply valve is open and said release valve is closed, a second position wherein said supply valve and said release valve are both closed and a third position wherein said release valve is opened and said supply valve is closed.

6. An electropneumatic brake control valve according to claim 1 wherein said supply valve is spring loaded to be pressed against a supply valve seat for a closed position and moveable by said common displaceable actuator to an open position.

7. An electropneumatic brake control valve according to claim 1 wherein said release valve is spring loaded to be pressed against a release valve seat for a closed position and moveable by said common displaceable actuator to an open position.

8. An electropneumatic brake control valve according to claim 1 wherein said force exerting means is a spring having a first end in contact with said pressure regulating means and a second end located at a predetermined position.

9. An electropneumatic brake control valve according to claim 8 wherein said predetermined position of said second end of said spring is adjustable.

10. An electropneumatic brake control valve according to claim 9 wherein said predetermined position of said second end of said spring is adjustable by a handwheel.

11. An electropneumatic brake control valve according to claim 1 wherein said means for positioning said pressure defining member includes a piston disposed within a cylinder, said cylinder having two air cylinder air spaces, a first cylinder air space on a first side of said piston and a second cylinder air space on a second side of said piston, a pressure of air in said first cylinder air space controlled by a first electrically activated valve and a pressure of air in said second cylinder air space controlled by a second electrically activated valve.

12. An electropneumatic brake control valve according to claim 11 wherein said first electrically activated valve normally opens a first supply path between an air supply and said first cylinder air space and normally closes a first exhaust path between said first cylinder air space and an exhaust, said first electrically activated valve, when energized, closing said first supply path to said first cylinder air space and, when energized, opening said first exhaust path between said first cylinder air space and said exhaust.

13. An electropneumatic brake control valve according to claim 11 wherein said second electrically activated valve normally opens a second supply path between an air supply and said second cylinder air space and normally closes a second exhaust path between said second cylinder air space and an exhaust, said second electrically activated valve, when energized, closing said second supply path to said second cylinder air space and, when energized, opening said second exhaust path between said second cylinder air space and said exhaust.

14. An electropneumatic brake control valve according to claim 11 further comprising:
  (i) a piston rod connected to said first side of said piston, said piston rod passing through a first port between said first cylinder air space and said feedback space, said piston rod connected to said pressure defining member;
  (ii) sealing means mounted circumferentially around said piston rod to seal between said first port and said piston rod to prevent leakage of air around said piston rod;
  (iii) a pressure balancing rod connected to said second side of said piston, said pressure balancing rod passing through a second port between said second cylinder air space and a pressure balancing space, said pressure balancing rod having a cross-sectional area about equal to a cross-sectional area of said piston rod;
  (iv) sealing means mounted circumferentially around said pressure balancing rod to seal between said second port and said pressure balancing rod to prevent leakage of air around said pressure balancing rod; and
  (v) a passage connecting said feedback space, containing said pressure defining members to said pressure balancing space so that a pressure of air in said pressure balancing space is about equal to a pressure of air in said feedback space whereby a force due to air acting on said piston rod is balanced out by an approximately equal and opposite force on said pressure balancing rod.

15. An electropneumatic brake control valve according to claim 14 wherein said passage connecting said feedback space, containing said pressure defining member, to said pressure balancing space passes in a lengthwise direction through at least a portion of said piston rod and through at least a portion of said pressure balancing rod.

16. An electropneumatic brake control valve according to claim 1 further comprising:
  (i) means positioned to determine a position of said pressure defining member, said means generating a signal indicative of said position of said pressure defining member;
  (ii) means connected to said electropneumatic brake control valve for transmitting said signal back to such brake control system of such railway vehicle to provide a feedback signal for control of said position of said pressure defining member.

17. An electropneumatic brake control valve according to claim 16 wherein said means for generating said signal indicative of said position of said pressure defining member employs a grey code for generating an unambiguous binary electrical signal indicative of said position.

18. An electropneumatic brake control valve according to claim 17 wherein said grey code is generated optically by a plurality of photosensors observing tracks attached to said pressure defining member.

19. An electropneumatic brake control valve according to claim 1 wherein said pressure defining member is a cam which is moved in a first direction by said means for positioning said pressure defining member and which presses against and positions said second of said at least three force and displacement communication portions of said means for positioning said common displaceable actuator.

20. An electropneumatic brake control valve according to claim 19 wherein said cam has a plurality of slopes so that a set of pressures resulting from a grey code have small changes between adjacent grey code steps when a brake application is light and large changes when such brake application is heavy.

21. An electropneumatic brake control valve according to claim 1 further comprising:
  (i) a second delivery passage for receiving a pneumatic brake application pressure signal from a pneumatic automatic brake valve controlled by a pressure of air in a brakepipe of such railway vehicle;
  (ii) a double check valve connected to receive such pneumatic brake application pressure signal from such pneumatic automatic brake valve and connected to receive said pressure in said first delivery passage, said double check valve passing a higher of said pressure in said first delivery passage and a pressure of such pneumatic brake application pressure signal to a third delivery passage, said third delivery passage for connection to such brake shoe application means of such railway vehicle.

22. An electropneumatic brake control valve according to claim 21 further including a pipe bracket for mounting said electropneumatic brake control valve and such pneumatic automatic brake valve, said pipe bracket having a passage for connecting such pneumatic brake application pressure signal to said second delivery passage for receiving such pneumatic brake application pressure signal.

23. An electropneumatic brake control valve according to claim 21 further including a pipe bracket for mounting said electropneumatic brake control valve and such pneumatic automatic brake valve, said pipe bracket having a second supply passage for connection to said first supply passage, said second supply passage being for connection to a supply reservoir of such railway vehicle.

24. An electropneumatic brake control valve according to claim 21 further including a pipe bracket for mounting said electropneumatic brake control valve and such pneumatic automatic brake valve, said pipe bracket having a passage, said passage being for connection to such brake shoe application means of such railway vehicle.

25. An electropneumatic brake control valve according to claim 21 further comprising:
  a filling piece connected to said double check valve, said filling piece being connectable to a service portion of such pneumatic automatic brake valve for connecting such pneumatic brake application pressure signal to said double check valve, said filling piece also being connectable to a standard pipe bracket to convey supply air to said first supply passage of said electropneumatic brake control valve and to connect said third delivery passage of said electropneumatic brake control valve to such brake shoe application means of such railway vehicle.

* * * * *